(12) United States Patent
Hund et al.

(10) Patent No.: US 10,356,236 B2
(45) Date of Patent: Jul. 16, 2019

(54) CONTROLLING COMMUNICATION BETWEEN A BUILDING-EXTERNAL COMMUNICATION SERVER AND A BUILDING-INTERNAL COMMUNICATION ENTITY

(71) Applicant: Deutsche Telekom AG, Bonn (DE)

(72) Inventors: Martin Hund, Rettert (DE); Thomas Unterschuetz, Weiterstadt (DE); Thorsten Sinning, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 324 days.

(21) Appl. No.: 14/864,885

(22) Filed: Sep. 25, 2015

(65) Prior Publication Data
US 2016/0094701 A1 Mar. 31, 2016

(30) Foreign Application Priority Data
Sep. 25, 2014 (DE) .......................... 10 2014 113 884

(51) Int. Cl.
*H04M 1/725* (2006.01)
*H04W 76/11* (2018.01)
(Continued)

(52) U.S. Cl.
CPC .... *H04M 1/72533* (2013.01); *H04L 12/2834* (2013.01); *H04L 43/0811* (2013.01);
(Continued)

(58) Field of Classification Search
CPC . H04L 12/2834; H04L 43/0811; H04L 69/40; H04M 1/72533; G06F 19/322;
(Continued)

(56) References Cited

U.S. PATENT DOCUMENTS 10,156,831 B2 * 12/2018 Raji .................. G06Q 30/02
2002/0181416 A1 * 12/2002 Lee .................... H04W 88/16
370/327
(Continued)

*Primary Examiner* — Matthew C Sams
(74) *Attorney, Agent, or Firm* — Leydig, Voit & Mayer, Ltd.

(57) ABSTRACT

An access portal for controlling communication between a building-external communication server of a building-external communication network and a building-internal communication entity of a building-internal communication network includes: a memory for storing authentication data for initiating a communication connection to the communication server; a first communication interface for establishing communication with the building-external communication server using the stored authentication data, wherein the first communication interface is configured to monitor the communication connection to the building-external communication server and, in the event of a fault in the communication connection, to generate a fault message; and a second communication interface for communicating with the communication entity, wherein the second communication interface is configured to send the stored authentication data to the building-internal communication entity in response to receiving the fault message in order to initiate a communication connection between the building-internal communication entity and the building-external communication server.

13 Claims, 6 Drawing Sheets

(51) Int. Cl.
*H04W 76/19* (2018.01)
*H04L 12/28* (2006.01)
*H04L 29/14* (2006.01)
*H04W 12/06* (2009.01)
*H04L 12/26* (2006.01)

(52) U.S. Cl.
CPC ............ *H04L 69/40* (2013.01); *H04W 12/06* (2013.01); *H04W 76/11* (2018.02); *H04W 76/19* (2018.02)

(58) Field of Classification Search
CPC ........... G06F 19/3481; G05D 23/1931; H04W 76/19; H04W 76/11; H04W 12/06
See application file for complete search history.

(56) References Cited

U.S. PATENT DOCUMENTS

| | | |
|---|---|---|
| 2009/0239502 A1 | 9/2009 | Dempo et al. |
| 2010/0083356 A1 | 4/2010 | Steckley et al. |
| 2012/0061068 A1* | 3/2012 | Anderson ................ F24F 11/30 165/254 |

* cited by examiner

CONTROLLING COMMUNICATION BETWEEN A BUILDING-EXTERNAL COMMUNICATION SERVER AND A BUILDING-INTERNAL COMMUNICATION ENTITY

CROSS-REFERENCE TO RELATED APPLICATIONS

Priority is claimed to German Patent Application No. DE 102014113884.8, filed on Sep. 25, 2014, the entire disclosure of which is hereby incorporated by reference herein.

FIELD

The present invention relates to an access portal for controlling communication between a building-external communication server of a building-external communication network and a building-internal communication entity of a building-internal communication network, wherein the access portal comprises a memory for storing authentication data for initiating the communication connection to the building-external communication server. The present invention further relates to a building-internal communication entity for controlling communication between a building-external communication server of a building-external communication network and the building-internal communication entity, wherein the building-internal communication entity comprises a memory for storing authentication data for initiating the communication connection to the building-external communication server. The invention further relates to a method for controlling communication between a building-external communication server and a building-internal communication entity comprising storing authentication data for initiating the communication connection to the building-external communication server.

BACKGROUND

In the field of building and home automation, there are different topological approaches for controlling electrical appliances in the networked home, firstly the gateway topological approach and secondly the server topological approach. In the case of the gateway topological approach (see FIGS. 1a and 1b), a gateway 110 (FIG. 1A) or a hub 120 (FIG. 1B) is to be provided in the household or building network 102, which gateway or hub is in communication 106, 116 with a server 108 in a data centre or a building-external network and can be remotely controlled via the internet 104. The electrical appliances 111, 112, 121, 131 located in the house or building network 102 communicate locally with the gateway 110 or the hub 120 via a bus system 107, 117, which is wired or is in contact with the appliances by wireless communication and WLAN. In the case of the server topological approach (see FIG. 1c), the electrical appliances are directly connected to the internet 126, communicate on the internet with a server 108 and are directly controlled from there.

With respect to reliability, both concepts have their weaknesses. The first concept is for example disadvantageous in that when the gateway/hub fails, the communication of the electrical appliances with the internet is not ensured. The second concept is disadvantageous in that when the internet connection fails, the electrical appliances in the house can no longer be controlled.

SUMMARY

In an embodiment, the invention provides an access portal for controlling communication between a building-external communication server of a building-external communication network and a building-internal communication entity of a building-internal communication network. The access portal includes: a memory for storing authentication data for initiating a communication connection to the communication server of the building-external communication network; a first communication interface for establishing communication with the building-external communication server using the stored authentication data, wherein the first communication interface is configured to monitor the communication connection to the building-external communication server and, in the event of a fault in the communication connection, to generate a fault message; and a second communication interface for communicating with the communication entity of the building-internal communication network, wherein the second communication interface is configured to send the stored authentication data to the building-internal communication entity in response to receiving the fault message in order to initiate a communication connection between the building-internal communication entity and the building-external communication server.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
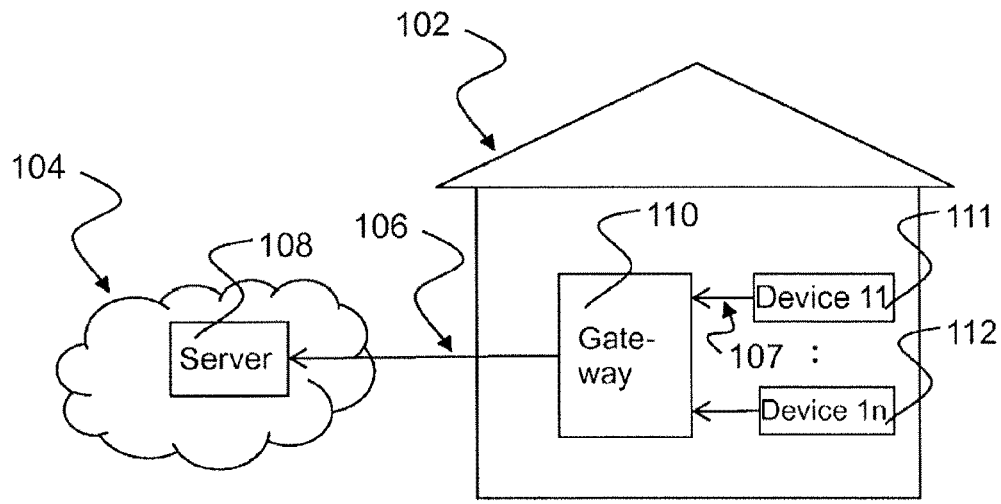
FIG. 1a is a schematic view of the control of a building automation network 102 according to a gateway topological approach comprising a gateway 110.
Figure 1B:
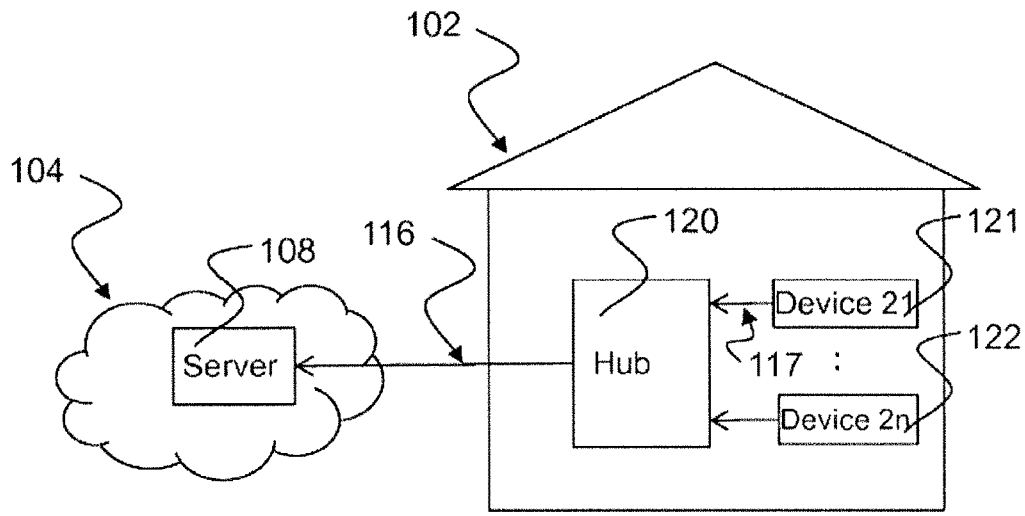
FIG. 1b is a schematic view of the control of a building automation network 102 according to a gateway topological approach comprising a hub 120.

A problem addressed by the present invention is that of creating a concept for improved reliability of a building automation system which can be applied to building automation systems with and without an access portal or gateway.

The term "building automation" and thus recording and transferring data within a building or building complex includes not only controlling functions within a building, but rather extends broadly to controlling any desired functionalities and to reading any sensors within a building or building complex. This also includes for example operating alarm systems and reading biological parameters of people located in the building, in particular in the context of healthcare. In particular, building automation also includes monitoring, open and closed-loop control and optimisation means, in which all sensors, actuators, operating elements, loads and other technical units are networked.

The methods and systems presented in the following can be used to control communication between a building-external communication server of a building-external communication network and a building-internal communication entity of a building-internal communication network.

A building-internal communication network in this case refers to any network which is concentrated on a geographically limited, i.e. geographically local region and conventionally refers to the networking of a house, a building or building complex or a business. It does not necessarily have to be a single building, it can also refer to a collection of buildings which are combined for example under the umbrella of one company or group of companies. It also does not necessarily have to be a building in the strict sense of the word; open-air spaces and other localities which are provided with an available communication network, for example open-air theatre performances, public viewings, etc. should also fall under the term "building" in this application.

The building-internal communication network can be a wired network, for example using Ethernet, USB, fieldbus, cable, etc. The building-internal communication network can be a wireless network, for example using WLAN, WiFi, Bluetooth, infrared or other short-range communication standards. As protocols for the transfer of data via the building-internal communication network, for example IPv4 or IPv6 can be used.

A building-external communication network refers to a network which does not belong to the building-internal communication network. It can be for example a public network such as the internet, a telephone network of a telephone service provider, for example a wired network, such as a POTS, ISDN, DSL or cable network or a wireless network, such as a mobile communication network of a mobile network operator, such as a cellular network, for example using a mobile communication standard such as LTE, UMTS, GSM, etc. As protocols for the transfer of data via the building-external communication network, IPv4 or IPv6 can be used or ATM, STM or other long-distance communication standards.

The communication server of the building-external communication network can be an authentication server in which a device must be authenticated in order to gain access to a building-internal communication network. The communication server can be provided at any desired location on the internet. The server can be a virtual server.

The server can be provided in the cloud. Cloud or cloud computing is to be understood to mean in this case the concept of providing abstracted IT infrastructures such as computing capacity, data storage, network capacities, ready-to-use software or in this case the server dynamically adapted to requirements via a network. The abstracted IT infrastructure provided is also referred to as cloud. Defined technical interfaces and protocols can define what these services offer and how they can be used.

A building-internal communication entity or network entity describes a unit, functional unit or entity in a building-internal communication network or building automation network. A building-internal communication entity can receive signals from the building-internal communication network and/or send signals to the building-internal communication network. A building-internal communication entity or network entity can be for example an actuator or sensor which has a modem, a network card, a network termination or a network adapter. A building-internal communication entity or network entity can comprise hardware and/or software in order to implement the technical functions of the building-internal communication entity. A building-internal communication entity or network entity can comprise microprocessors, microchips, ASICs and/or DSPs.

The methods and systems presented in the following can be of different types. The individual elements described can be achieved by hardware or software components, for example electronic components which can be produced by means of various technologies and comprise for example semiconductor chips, ASICs, microprocessors, digital signal processors, integrated electric circuits, electro-optical circuits and/or passive components.

The methods and systems presented in the following can be used in access portals and building-internal communication entities of building-internal communication networks. An access portal is a network entity which externally controls the access to a building-internal communication network, for example a building automation network. The access portal can be realised as a gateway or hub, it can also comprise router functionalities or can be realised as a router itself. A building-internal communication entity of a building-internal communication network refers to a component of said building-internal network. This can be for example a controllable actuator, for example a control element for heating, blinds, alarm systems, door locks, light switches, cookers, refrigerators, washing machines, coffee machines and dishwashers, or a controllable sensor, for example a temperature sensor, a pressure sensor, a light sensor, a light barrier, a clock or watch or a pair of glasses having a sensor function.

The methods and systems presented in the following can be based on software containers or, generally speaking, memories. A software container is a memory which can store data, parameters and programs. It can be for example a RAM or a ROM. The software container can also be realised as a virtual memory, for example as a piece of software code which comprises logic implementation. The software container can perform rudimentary functions of an operating system, but can be independent of the conventional operating systems with which it interacts. The software container can thus run on various operating systems and interact therewith. A software container can for example realise a task independently of the operating system, for example monitoring a building-internal network entity of a building automation network. For example, the software container can control a heating system according to measured or transferred temperature values from a temperature sensor. The software container can implement control tasks in a closed context of a building. For this purpose, the software container can have authentication parameters which allow authentication thereof in the authentication server which is responsible for the building. In this case, the software container is realised in a streamlined and economical manner, that is to say, by contrast with an operating system, it only has a few functions, which are sufficient for the context of building automation in which it can operate. The software container can perform the control and authentication tasks thereof for example by means of a few lines of code or parameters.

Aspects of the invention are based on the concept of providing software containers or, generally speaking, memories in the gateway or access portal of the building-internal communication network, but also in other selected devices, that is to say building-internal communication entities of the building-internal communication network. A software container can be for example a virtual server container. This can be a software which operates in a local environment, but provides functionalities of a server and is externally perceived as a server which is independent of the operating system. The virtual server container is autonomous with respect to the embedding system and can also act as a network layer between the client and the server, that is to say as middleware.

Software containers are able to receive and send data. Said data can be for example authentication data. Said authentication data can be user data, in particular the software container can also emulate a SIM card and thus provide access to encrypted data or act as an access key to wireless networks such as the mobile communication network or output other access data or access information.

The set-up and use of the software container can be monitored and controlled in the gateway by a rule engine, that is to say a processor which operates according to predefinable rules. Said rule engine can be designed in such a way that it only accesses devices locally and can additionally be secured by encryption so as to be protected against tampering. The client can receive the user inputs and send them to the software container. There, they can be processed, and the result can be sent back to the client, which can communicate with other entities. The advantage of this solution lies in the fact that the client can be exchanged almost entirely as desired without having to change anything in the application logic.

Software containers do not have to be stand-alone, executable software, but rather can be part of an application server. However, there are also some variants which can be used without application servers.

The advantage of a software container thus lies in particular in the flexibility of the software container and the independence thereof from the conditions of the operating system.

According to a first aspect, the invention relates to an access portal for controlling communication between a building-external communication server of a building-external communication network and a building-internal communication entity of a building-internal communication network, comprising: a memory for storing authentication data for initiating a communication connection to the communication server of the building-external communication network; a first communication interface for establishing communication with the building-external communication server using the stored authentication data, wherein the first communication interface is designed to monitor the communication connection to the building-external communication server and, in the event of a fault in the communication connection, to generate a fault message; and a second communication interface for communicating with the communication entity of the building-internal communication network, wherein the second communication interface is designed to send the stored authentication data to the building-internal communication entity in response to receiving the fault message in order to initiate a communication connection between the building-internal communication entity and the building-external communication server.

This is advantageous in that the access portal offers flexibility and independence from the conditions of the operating system due to the storage of the authentication data for initiating a communication connection to the communication server. By storing the authentication data in the memory of the access portal, the communication connection can be flexibly changed over from the access portal to the building-internal communication entity if the communication connection between the access portal and the server fails.

According to one embodiment of the access portal, the memory is further designed to store parameters for controlling the communication entity of the building-internal communication network, and the second communication interface is designed to send the stored parameters for controlling the communication entity of the building-internal communication network to the building-internal communication entity in response to receiving the fault message.

This is advantageous in that, when the communication connection between the access portal and the server fails, in addition to the authentication data, additional parameters can be transmitted which are required for controlling components of the building-internal communication network, for example threshold values for operating control elements such as temperature threshold values or ranges which establish day or night operation of the building.

According to one embodiment of the access portal, the memory is further designed to store programs for controlling the communication entity of the building-internal communication network, and the second communication interface is designed to send the stored programs for controlling the communication entity of the building-internal communication network to the building-internal communication entity in response to receiving the fault message.

This is advantageous in that that whole logic blocks, which are implemented in the form of software or programs, can be flexibly transmitted from the access portal to the building-internal communication entity.

According to one embodiment of the access portal, the programs are realised in the form of a script language to control the communication entity of the building-internal communication network.

This is advantageous in that the programs can easily be implemented and can be understood by the user.

According to one embodiment, the access portal further comprises a processor which is designed to execute control tasks for controlling the building-internal communication entity of the building-internal communication network using the second communication interface, and is further designed to still execute at least some of the control tasks after sending the stored authentication data to the building-internal communication entity.

This is advantageous in that the access portal is flexible in processing control tasks.

According to one embodiment of the access portal, the processor is designed to store the other control tasks which are no longer executed by the processor in the memory in the form of programs.

This is advantageous in that control tasks can be transmitted easily and flexibly to other communication entities of the building or even to the server. Control tasks in the form of programs can be easily understood by the other units and can be implemented quickly.

According to one embodiment of the access portal, the at least some control tasks which are still executed by the processor burden the second communication interface to a greater extent than the other control tasks which are no longer executed by the processor.

This is advantageous in that the control tasks which lead to a great burden on the second (local) communication interface between the access portal and the building-internal communication entity, that is to say are generally load-intensive, are additionally executed on the access portal and therefore remain on the access portal and do not have to be outsourced to the server. The majority of the load thus remains concentrated on the local communication interface and is not outsourced to the building-external communication interface between the server and the local communication entity.

According to one embodiment of the access portal, the at least some control tasks which are still executed by the processor include local control tasks, and the other control tasks which are no longer executed by the processor include remote control tasks.

This is advantageous in that the control tasks can be flexibly allocated to the access portal and the server, and therefore the load on the communication interfaces can be optimally distributed.

According to one embodiment of the access portal, the access portal is a gateway, a hub or a router.

This is advantageous in that said components are standard components which can easily be exchanged.

According to one embodiment of the access portal, the building-internal communication entity of the building-internal communication network is a controllable actuator, in particular a control element for heating, blinds, alarm systems, door locks, light switches, cookers, refrigerators, washing machines, coffee machines and dishwashers.

This is advantageous in that the controllable actuator can be controlled via the access portal and has appropriate intelligence for taking over the authentication to the server so that it can control itself or can be controlled directly via the server in the event that the connection thereof to the access portal fails.

According to one embodiment of the access portal, the building-internal communication entity of the building-internal communication network is a controllable sensor, in particular a temperature sensor, a pressure sensor, a light sensor, a light barrier, a watch or a pair of glasses having a sensor function.

This is advantageous in that the controllable sensor can be controlled via the access portal and has appropriate intelligence for taking over the authentication to the server so that it can control itself or can be controlled directly via the server in the event that the connection thereof to the access portal fails.

According to one embodiment of the access portal, the second communication interface is a close-range interface, in particular one of the following: a Bluetooth interface, an infrared interface, a WiFi interface, a WLAN interface, an NFC interface, a USB interface.

This is advantageous in that a close-range interface can be implemented in a standard manner and is advantageous in terms of complexity with respect to power, energy efficiency and costs. The close-range interfaces can easily be adapted to the requirements of the building-internal communication entities.

According to one embodiment of the access portal, the memory is realised in the form of a SIM card or a UICC card. According to one embodiment of the access portal, the SIM card is designed as an embedded SIM card or as part of a processor architecture.

According to a second aspect, the invention relates to a building-internal communication entity of a building-internal communication network, comprising: a memory for storing authentication data for initiating a communication connection to a communication server of a building-external communication network, wherein the communication server of the building-external communication network controls the building-internal communication entity; a first communication interface for establishing communication with the building-external communication server using the stored authentication data, wherein the first communication interface is designed to monitor the communication connection to the building-external communication server and, in the event of a fault in the communication connection, to generate a fault message; and a second communication interface for communicating with a second communication entity, wherein the second communication interface is designed to send the stored authentication data to the second communication entity in response to receiving the fault message in order to initiate a communication connection between the second communication entity and the building-external communication server.

This is advantageous in that the building-internal communication entity offers flexibility and independence from the conditions of the operating system due to the storage of the authentication data for initiating a communication connection to the communication server. By storing the authentication data in the memory of the building-internal communication entity, the communication connection can be flexibly changed over from the building-internal communication entity to another building-internal communication entity or a control unit, such as a smartphone, if the communication connection between the building-internal communication entity and the server fails.

According to one embodiment, the building-internal communication entity comprises a processor which is designed to establish a communication connection to the second communication entity via the second communication interface in order to control the building-internal communication entity of the building-internal communication network based on the communication connection between the second communication entity and the building-external communication server by means of the building-external communication server.

This is advantageous in that the communication connection can be flexibly rerouted via a second communication entity, for example routed via a smartphone, if the communication connection between the building-internal communication entity and the server fails. The flexibility and reliability of the system are thus increased.

According to one embodiment of the building-internal communication entity, the communication connection between the second communication entity and the building-external communication server is a mobile communication connection.

This is advantageous in that, when the internet connection fails, a mobile communication connection can be flexibly used, for example via a device comprising a mobile communication adapter, for example a smartphone, which is available in the building. The reliability and flexibility of the system are thus increased.

According to one embodiment of the building-internal communication entity, the second communication entity is a second building-internal communication entity of the building-internal communication network.

This is advantageous in that another device which is available in the building can take over the establishment of communication. For example, the heating control can then be taken over by the refrigerator control. This increases the flexibility and reliability of the building automation system.

According to one embodiment of the building-internal communication entity, the second communication entity is a control unit for controlling the building-internal communication entity, in particular a smartphone, a mobile phone, a tablet PC or a communication device comprising a wireless adapter.

This is advantageous in that control units of this type are readily available, since nowadays almost everyone has a smartphone, mobile phone or a tablet PC. The building automation system is thus easy to control.

According to one embodiment of the building-internal communication entity, the memory is further designed to store parameters for controlling the building-internal communication entity of the building-internal communication network, and the second communication interface is designed to send the stored parameters for controlling the building-internal communication entity of the building-internal communication network to the second communication entity in response to receiving the fault message.

This is advantageous in that, when the communication connection between the building-internal communication entity and the server fails, in addition to the authentication data, additional parameters can be transmitted which are required for controlling components of the building-internal communication network, for example threshold values for operating control elements such as temperature threshold values or ranges which establish day or night operation of the building.

According to one embodiment of the building-internal communication entity, the memory is further designed to store programs for controlling the building-internal communication entity of the building-internal communication network, and the second communication interface is designed to send the stored programs for controlling the building-internal communication entity of the building-internal communication network to the second communication entity in response to receiving the fault message.

This is advantageous in that that whole logic blocks, which are implemented in the form of software or programs, can be flexibly transmitted from the building-internal communication entity to the second communication entity.

According to one embodiment of the building-internal communication entity, the programs are realised in the form of a script language to control the building-internal communication entity of the building-internal communication network.

This is advantageous in that the programs can easily be implemented and can be understood by the user.

According to one embodiment of the building-internal communication entity, the building-internal communication entity of the building-internal communication network is a controllable actuator, in particular a control element for heating, blinds, alarm systems, door locks, light switches, cookers, refrigerators, washing machines, coffee machines and dishwashers.

This is advantageous in that the controllable actuator can be controlled via the building-internal communication entity and has appropriate intelligence for taking over the authentication to the server so that it can control itself or can be controlled directly via the server in the event that the connection thereof to the building-internal communication entity fails.

According to one embodiment of the building-internal communication entity, the building-internal communication entity is a controllable sensor, in particular a temperature sensor, a pressure sensor, a light sensor, a light barrier, a watch or a pair of glasses having a sensor function.

This is advantageous in that the controllable sensor can be controlled via the building-internal communication entity and has appropriate intelligence for taking over the authentication to the server so that it can control itself or can be controlled directly via the server in the event that the connection thereof to the building-internal communication entity fails.

According to one embodiment of the building-internal communication entity, the second communication interface is a close-range interface, in particular one of the following: a Bluetooth interface, an infrared interface, a WiFi interface, a WLAN interface, an NFC interface, a USB interface.

This is advantageous in that a close-range interface can be implemented in a standard manner and is advantageous in terms of complexity with respect to power, energy efficiency and costs. The close-range interfaces can easily be adapted to the requirements of the building-internal communication entities.

According to one embodiment of the building-internal communication entity, the memory is realised in the form of a SIM card or a UICC card. According to one embodiment of the building-internal communication entity, the SIM card is designed as an embedded SIM card or as part of a processor architecture.

According to a third aspect, the invention relates to a method for controlling communication between a building-external communication server of a building-external communication network and a building-internal communication entity of a building-internal communication network, comprising: storing authentication data for initiating a communication connection to the building-external communication server in a memory of an access portal for controlling the communication between the building-external communication server and the building-internal communication entity; establishing communication with the building-external communication server by means of the access portal using the stored authentication data; and sending the stored authentication data to the building-internal communication entity by means of the access portal to initiate a communication connection between the building-internal communication entity and the building-external communication server in the event of a fault in the communication connection between the access portal and the building-external communication server.

This is advantageous in that the method offers flexibility and independence from the conditions of the operating system due to the storage of the authentication data for initiating a communication connection to the communication server. By storing the authentication data in the memory of the access portal, the communication connection can be flexibly changed over from the access portal to the building-internal communication entity if the communication connection between the access portal and the server fails.

According to one embodiment of the method, the access portal is a gateway, a hub or a router.

This is advantageous in that said components are standard components which can easily be exchanged.

According to a fourth aspect, the invention relates to a method for controlling communication between a building-external communication server of a building-external communication network and a building-internal communication entity of a building-internal communication network, comprising: storing authentication data for initiating a communication connection to the building-external communication server in a memory of the building-internal communication entity; establishing communication with the building-external communication server by means of the building-internal communication entity using the stored authentication data; and sending the stored authentication data to a second communication entity by means of the building-internal communication entity to initiate a communication connection between the second communication entity and the building-external communication server in the event of a fault in the communication connection between the building-internal communication entity and the building-external communication server.

This is advantageous in that the method offers flexibility and independence from the conditions of the operating system due to the storage of the authentication data for initiating a communication connection to the communication server. By storing the authentication data in the memory of the building-internal communication entity, the communication connection can be flexibly changed over from the building-internal communication entity to another building-internal communication entity or a control unit, such as a smartphone, if the communication connection between the building-internal communication entity and the server fails.

According to one embodiment, the method comprises establishing a communication connection between the building-internal communication entity and the second communication entity; and controlling the building-internal communication entity on the basis of the communication connection between the second communication entity and the building-external communication server and the communication connection between the second communication entity and the building-internal communication entity by means of the building-external communication server.

This is advantageous in that the communication connection can be flexibly rerouted via a second communication entity, for example routed via a smartphone, if the communication connection between the building-internal communication entity and the server fails. Such a method thus offers greater flexibility and reliability.

According to one embodiment of the method, the second communication entity is a second building-internal communication entity of the building-internal communication network.

According to one embodiment of the building-internal communication entity, the second communication entity is a second building-internal communication entity of the building-internal communication network.

This is advantageous in that, in such a method, another device which is available in the building can take over the establishment of communication. For example, the heating control can then be taken over by the refrigerator control. This increases the flexibility and reliability of the method.

According to one embodiment of the method, the second communication entity is a control unit for controlling the building-internal communication entity of the building-internal communication network, in particular a smartphone, a mobile phone, a tablet PC or a communication device comprising a wireless adapter.

This is advantageous in that control units of this type are readily available, since nowadays almost everyone has a smartphone, mobile phone or a tablet PC. The building automation system is thus easy to control.

Further embodiments are explained with reference to the accompanying drawings.

In the following detailed description, reference is made to the accompanying drawings, which form part thereof and in which specific embodiments in which the invention can be implemented are shown by way of illustration. It is understood that other embodiments can also be used and structural or logical changes can be made without deviating from the concept of the present invention. The following detailed description is therefore not to be understood in a restrictive sense. It is further understood that the features of the various embodiments described herein can be combined unless specifically indicated otherwise.

The aspects and embodiments are described with reference to the drawings, wherein like reference numerals generally relate to like elements. In the following description, numerous specific details are presented for explanatory purposes so as to provide a thorough understanding of one or more aspects of the invention. However, to a person skilled in the art, it may be clear that one or more aspects or embodiments can be implemented with the specific details to a lesser degree. In other cases, known structures and elements can be shown schematically in order to make it easier to describe one or more aspects or embodiments. It is understood that other embodiments can be used and structural or logical changes can be made without deviating from the concept of the present invention.

Even if a particular feature or a particular aspect of an embodiment may have been disclosed with respect to only one of several implementations, a feature of this type or an aspect of this type can also be combined with one or more other features or aspects of the other implementations as may be desirable and advantageous for a given or particular application. Furthermore, to the extent that the expressions "contain", "have", "comprise" or other variants thereof have been used either in the detailed description or in the claims, such expressions should be inclusive, in a similar manner to the expression "include". The expressions "coupled" and "connected" may have been used together with derivatives thereof. It is understood that such expressions are used to indicate that two elements cooperate or interact with one another regardless of whether they are in direct physical or electrical contact or are not in direct contact with one another. In addition, the expression "by way of example" is merely to be taken as an example rather than an indication of the best or optimal option. The following description is therefore not to be understood in a restrictive sense.

Figure 1C:
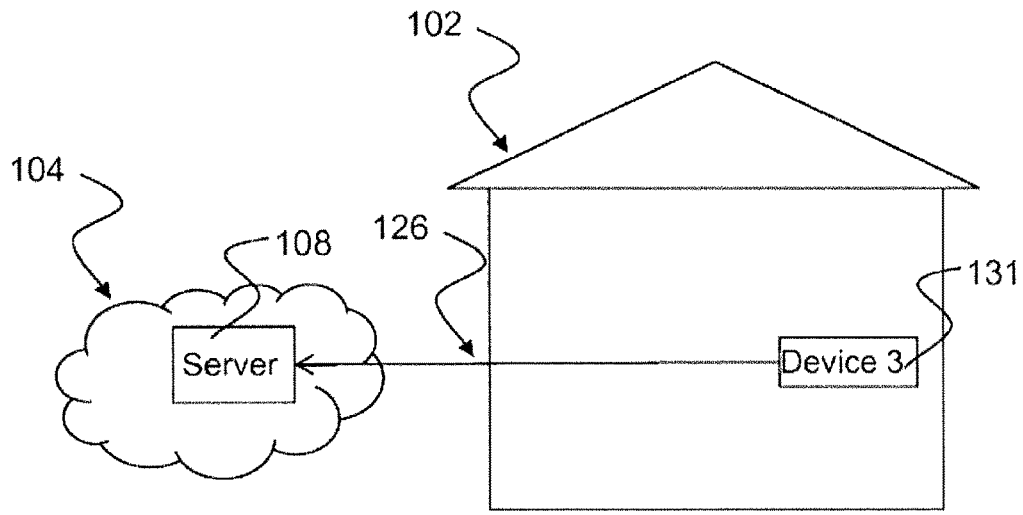
FIG. 1c is a schematic view of the control of a building automation network 102 according to a server topological approach.
Figure 2A:
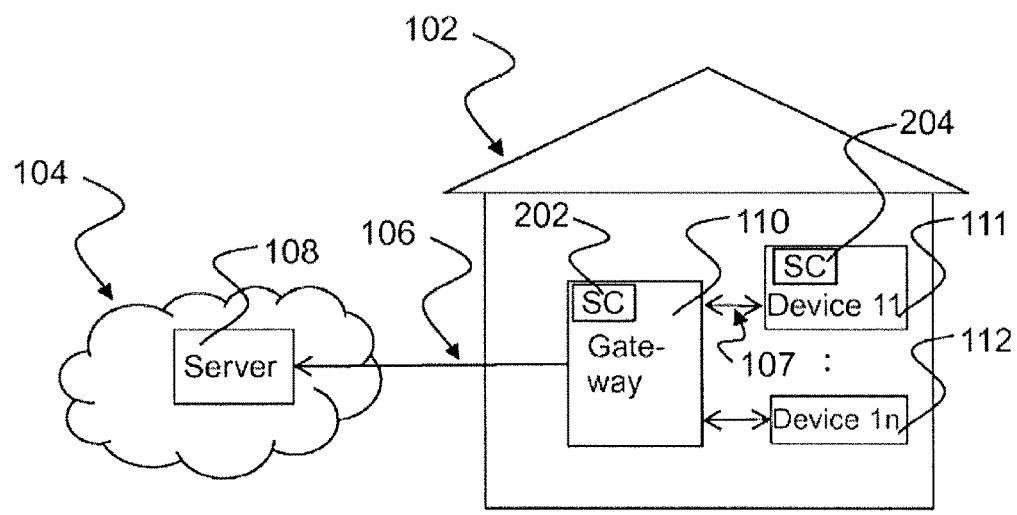
FIG. 2a is a schematic view of the control of a building automation network 102 according to a gateway topological approach comprising a gateway 110 according to one embodiment of the invention.
Figure 2B:
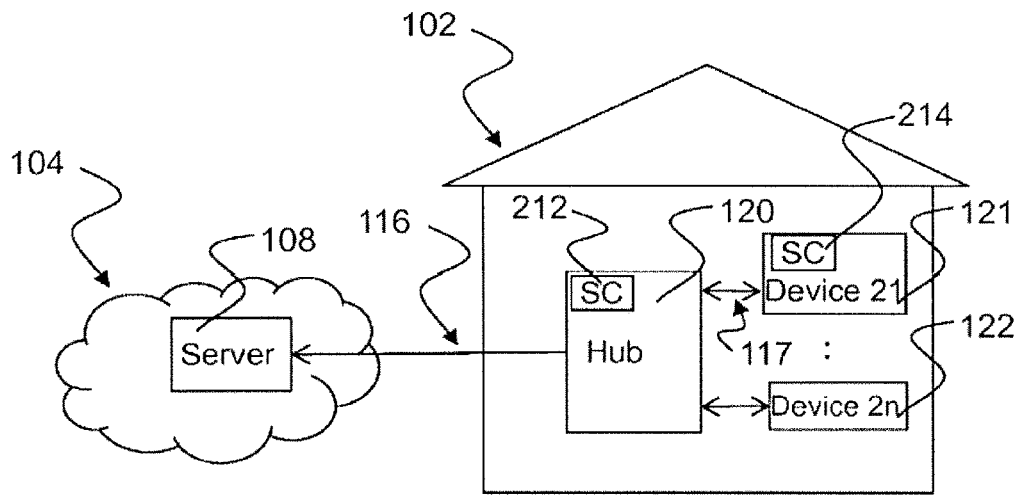
FIG. 2b is a schematic view of the control of a building automation network 102 according to a gateway topological approach comprising a hub 120 according to one embodiment of the invention.
Figure 2C:
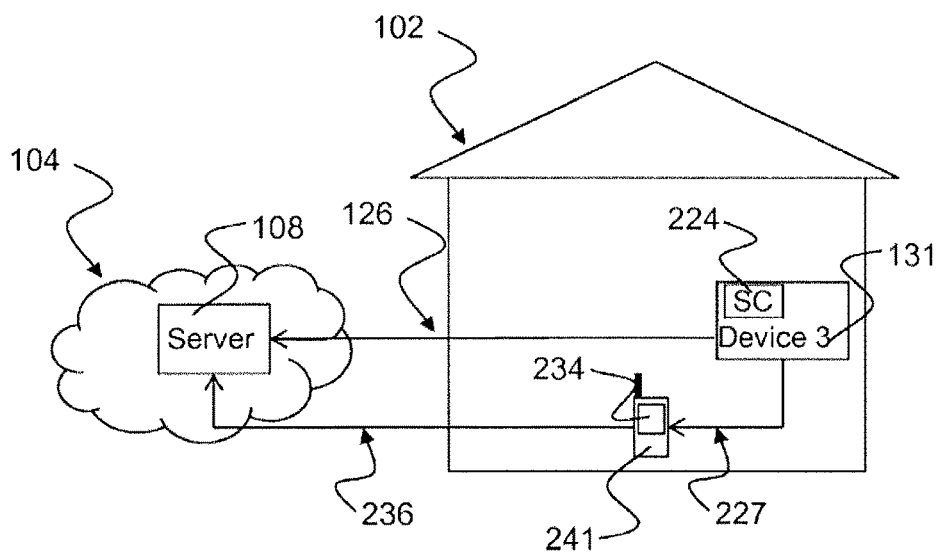
FIG. 2c is a schematic view of the control of a building automation network 102 according to a server topological approach according to one embodiment of the invention.

FIGS. 2a, 2b and 2c show an overview of the individual topologies. FIG. 2a shows a topology comprising a gateway which, in the event of the failure of the internet connection, can completely take over functions of the backend server at a local level. FIG. 2b shows a topology comprising a hub which, in the event of the failure of the internet connection, can take over partial functions of the backend server at a local level. FIG. 1c shows a topology in which a device is directly connected to the backend server which, in the event that the internet connection fails, does not provide any functions of the backend server at a local level.

FIG. 2a is a schematic view of the control of a building automation network 102 according to a gateway topological approach comprising a gateway 110 according to one embodiment of the invention.

FIG. 2a shows an access portal 110, for example a gateway, for controlling communication between a building-external communication server 108 of a building-external communication network 104, for example the internet, and one or more building-internal communication entities 111, 112 of a building-internal communication network 102, for example a building automation network. The access portal 110 comprises a software container or, generally speaking, a memory 202 for storing authentication data for initiating a communication connection to the communication server 108 of the building-external communication network 104. The access portal 110 comprises a first communication interface 106 for establishing communication with the building-external communication server 108 using the stored authentication data. The first communication interface 106 is designed to monitor the communication connection to the building-external communication server 108 and, in the event of a fault in the communication connection, to generate a fault message. The access portal 110 comprises a second communication interface 107 for communicating with the one or more building-internal communication entities 111, 112. The second communication interface 107 is designed to send the stored authentication data for initiating a communication connection between one of the building-internal communication entities 111, 112 and the building-external communication server 108 to the corresponding building-internal communication entity 111, 112 in response to receiving the fault message.

In this case, both the gateway 110 and a selected device 111, which contains for example a mobile communication transmitter (not shown in FIG. 2a), can be provided with a software container SC 202. If the internet connection 106 between the gateway 110 and the server 108 should fail, all connections can be changed over to the mobile communication device, and the device 111 can then establish a connection to the server 108 via mobile communication.

The software container 202 can be used to provide the mobile communication access data and components of the operating software of the gateway 110. Because it is probable in this case that the bandwidth will not be sufficient to provide full data traffic between the backend server 108 and the home gateway 110, all local components can preferably be controlled autonomously via the gateway 110. Only some remote controls of components need to be controlled from the backend server 108 via the device 111 so that data traffic can be reduced.

The memory 202 can store parameters for controlling the building-internal communication entity 111, 112. The second communication interface 107 can send the stored parameters for controlling the building-internal communication entity 111, 112 to the building-internal communication entity 111, 112 in response to receiving the fault message.

The memory 202 can store programs for controlling the building-internal communication entity 111, 112. The second communication interface 107 can send the stored programs for controlling the building-internal communication entity 111, 112 to the building-internal communication entity 111, 112 in response to receiving the fault message. The programs for controlling the building-internal communication entity 111, 112 can be realised in the form of a script language.

The access portal 110 can further comprise a processor which can execute control tasks for controlling the building-internal communication entity 111, 112 using the second communication interface 107. The processor can further be designed to still execute at least some of the control tasks after sending the stored authentication data to the building-internal communication entity 111, 112.

The processor can be designed to store the other control tasks which are no longer executed by the processor in the memory 202 in the form of programs.

For example, the at least some control tasks which are still executed by the processor burden the second communication interface 107 to a greater extent than the other control tasks which are no longer executed by the processor. The at least some control tasks which are still executed by the processor can include for example local control tasks. The other control tasks which are no longer executed by the processor can include for example remote control tasks.

The access portal 110 can be a gateway, as shown in FIG. 2a. It can be a hub 120, as shown in FIG. 2b, or it can be a router.

The building-internal communication entity 111, 112 can be a controllable actuator, for example a control element for heating, blinds, alarm systems, door locks, light switches, cookers, refrigerators, washing machines, coffee machines and dishwashers. The building-internal communication entity 111, 112 can be a controllable sensor, for example a temperature sensor, a pressure sensor, a light sensor, a light barrier, a clock or watch or a pair of glasses having a sensor function.

In one embodiment, the watch can detect whether the person has gone to sleep, for example determining a drop in temperature below a predetermined threshold value, for example from 30 to 40 degrees Celsius by means of a temperature sensor, and detect therefrom that the watch is no longer located on the person's body. In this case, the watch can prompt the lights in the building to be switched off, and optionally prompt the heating to be lowered to night operation, the shutters to be closed or the blinds in the house or building to be lowered. The same control tasks can also be carried out by a pair of glasses having a sensor function. For example, a camera, which is integrated in the glasses or is attached to the glasses, detects whether the person has gone to sleep, for example if the glasses have been placed in a location and the recorded image sequence is no longer changing, or if they have been switched to energy saving mode. The glasses can also be equipped with a temperature sensor to measure the person's body temperature and, if said temperature falls below a threshold value, to put the building into "sleep mode".

The logic circuit for detecting whether the temperature has dropped and then carrying out the appropriate measures does not have to be realised on the building-internal communication entity such as the watch or the pair of glasses. It can be sufficient for the watch or glasses to merely act as a sensor which detects the temperature data. The additional control logic circuit can be realised for this purpose on the gateway 110, on the server 108 or even in the cloud. The control logic circuit can be realised on a software container which, in the event that the corresponding connection fails, can be relayed to another device which can then take over all the control tasks of the building in this context ("sleep mode" of the building) when the temperature data is received.

The building automation system can decide for itself where to provide the logic circuit for controlling the individual building-internal communication entities. If the gateway 110 is more suitable therefor, the control logic circuit can be provided on the gateway 110. If the server 108 is more suitable therefor, then the control logic circuit can be implemented on the server 108. If the building-internal communication entity 111, 112 is more suitable therefor, then the control logic circuit can be provided on the building-internal communication entity. The transfer of the control logic circuit can be carried out via the software container or memory 202, 204. It is therefore not necessary, when installing the components of the building automation system, to determine which logic is run on which components of the system, but rather it is possible to decide in a flexible manner which logic is to be run on which components during the operation of the building automation system for the purpose of optimal operation of the building automation system with respect to resource conservation, stability, operational safety, robustness, reaction time, flexibility, convenience and additional parameters.

The transfer of the control logic from one network entity to another is also not necessarily linked to a communication connection failing. It can also be carried out in the case of functioning communication connections with the motivation of creating a flexible allocation of the control tasks to the appropriate devices in each case, that is to say for example the gateway 110, the hub 120, the communication server 108 and the building-internal communication entity 111, 112. This statement also applies of course to the additional embodiments described in FIGS. 2b, 2c, 3 and 4.

The second communication interface 107 can be a close-range interface, for example a Bluetooth interface, an infrared interface, a WiFi interface, a WLAN interface, an NFC interface, a USB interface or a local fieldbus.

The first communication interface 106 can be a wide-area interface which may fail. In this case, it is then possible to transfer the authentication data to a building-internal communication entity and, by means thereof, to allow the construction of a replacement communication connection to the server 108.

The server 108 can be provided in any desired location in the cloud, that is to say that the server 108 can be dynamically adapted to requirements or provided via a network. Defined technical interfaces and protocols can define what the server 108 offers and how it can be used.

The server 108 can be structured in the manner of a hierarchy, that is to say that a plurality of sub-servers can construct a corresponding connection to the access portal 110, 120 via respective second communication interfaces 106, 116. Some control and authentication tasks can be carried out by the sub-servers, whereas by contrast, other superordinate control and authentication tasks are carried out by the superordinate server. For example, in the scenario of a multi-party household or a housing association, a plurality of building-internal communication networks 102 can be present in a shared building or building complex, which networks each establish communication with a (sub-) server 108 which is allocated thereto, which server then redirects the communication to the superordinate server thereof. In this case, the multiple parties do not have to be located in the same building, they can also reside in various buildings. In the case of the multi-party household, some or all of the parties can also access a shared access portal, however, and therefore said partial parties form a shared building-internal communication network.

The software container can be realised in the form of a SIM card or a UICC card. The SIM card can be designed as an embedded SIM card or as part of a processor architecture. It is understood that this realisation of the software container can occur in all of the configurations described here.

FIG. 2b is a schematic view of the control of a building automation network 102 according to a gateway topological approach comprising a hub 120 according to one embodiment of the invention.

In this case, the establishment of the connection with the software container 212 used acts similarly to in the above-mentioned case of the gateway 110 (see FIG. 2a). Instead of the two devices 111 and 112, the two devices 121 and 122 are connected to the hub 120 via the second communication interface 117. The hub has a first communication interface 116 for establishing communication with the server 108 in the building-external communication network 104.

The difference between the hub 120 and the gateway 110 consists in the fact that the hub 120 can be equipped in a substantially simpler manner than the gateway 110. It could thus be the case that the hub 120 cannot take over the local components due to the simple construction thereof, and therefore for example a network connection has to be established via a device 121 having a mobile communication connection (not shown in FIG. 2b). In this case, the software container 214 should be provided in the device 121. It can be kept available virtually as a software container 214 in the operating software or in the emulated SIM card for a mobile communication device so that when in use, the device 121 can take over functions of the hub 120, such as establishing the connection to the server 108.

FIG. 2c is a schematic view of the control of a building automation network 102 according to a server topological approach according to one embodiment of the invention.

In FIG. 2c, a building-internal communication entity 131, for example a controllable actuator or a controllable sensor of a building-internal communication network 102, for example a building automation network, is shown. The building-internal communication entity 131 comprises a software container or, generally speaking, a memory 224 for storing authentication data for initiating a communication connection to a communication server 108 of a building-external communication network 104 which controls the building-internal communication entity 131.

The building-internal communication entity 131 comprises a first communication interface 126 for establishing communication with the building-external communication server 108 using the stored authentication data, wherein the first communication interface 126 is designed to monitor the communication connection to the building-external communication server 108 and, in the event of a fault in the communication connection, to generate a fault message.

The building-internal communication entity 131 comprises a second communication interface 227 for communicating with a second communication entity 241, for example a second building-internal communication entity or a control unit for controlling the building-internal communication entity 131, for example a smartphone (shown in FIG. 2a). The second communication interface 227 is designed to send the stored authentication data for initiating a communication connection 236 between the second communication entity 241 and the building-external communication server 108 to the second communication entity 241 in response to receiving the fault message.

The building-internal communication entity 131 can comprise a processor which is designed to establish a communication connection to the second communication entity 241 via the second communication interface 227 in order to control the building-internal communication entity 131 based on the communication connection 236 between the second communication entity 241 and the building-external communication server 108 by means of the building-external communication server 108.

In the case in which a building-internal communication entity 131 such as a household appliance is directly connected to the server 108 without an access portal such as a gateway 110 or a hub 120 (as shown in FIGS. 2a and 2b), and the internet connection 126 fails, the appliance 131 can transfer the authorisation data thereof to another appliance 241 in the vicinity in that said data is transferred to the software container 234 of the adjacent appliance 241 and in that the internet connection 236 is then re-established via another, fail-safe replacement medium 241. In this case, smartphones 241 located in the household can also be used (as shown in FIG. 2c) so as to allow diversification of the network access. WLAN networks of the same internet service provider can also be used as long as for example there is separation of the data and the capacities are sufficient. In addition, the software container 224 can also be used as a cache for data. For example weather data can thus be stored to control heating. In the event that the internet failed, such data would then also be available locally so as to bridge a period of downtime. When the internet connection 126 is reinstated, said software container 224 can then be updated.

The communication connection between the second communication entity 131 and the building-external communication server 108 can comprise for example a mobile communication connection 236 (as shown in FIG. 2c).

The second communication entity 241 can also be a second building-internal communication entity of the building-internal communication network 102 (not shown in FIG. 2c). The second communication entity 241 can be a control unit for controlling the building-internal communication entity 131, for example a smartphone (as shown in FIG. 2c), a mobile phone, a tablet PC or a communication device comprising a wireless adapter.

The memory 224 can store parameters for controlling the building-internal communication entity 131. The second communication interface 227 can send the stored parameters for controlling the building-internal communication entity 131 to the second communication entity 241 in response to receiving the fault message.

The memory 224 can further be designed to store programs for controlling the building-internal communication entity 131. The second communication interface 227 can send the stored programs for controlling the building-internal communication entity 131 to the second communication entity 241 in response to receiving the fault message. The programs for controlling the building-internal communication entity 131 can be realised for example in the form of a script language.

The building-internal communication entity 131 can be for example a controllable actuator, for example a control element for heating, blinds, alarm systems, door locks, light switches, cookers, refrigerators, washing machines, coffee machines and dishwashers. The building-internal communication entity 131 can be for example a controllable sensor, for example a temperature sensor, a pressure sensor, a light sensor or a light barrier.

The second communication interface 227 can be a close-range interface, for example a Bluetooth interface, an infrared interface, a WiFi interface, a WLAN interface, an NFC interface or a USB interface.

Figure 3:
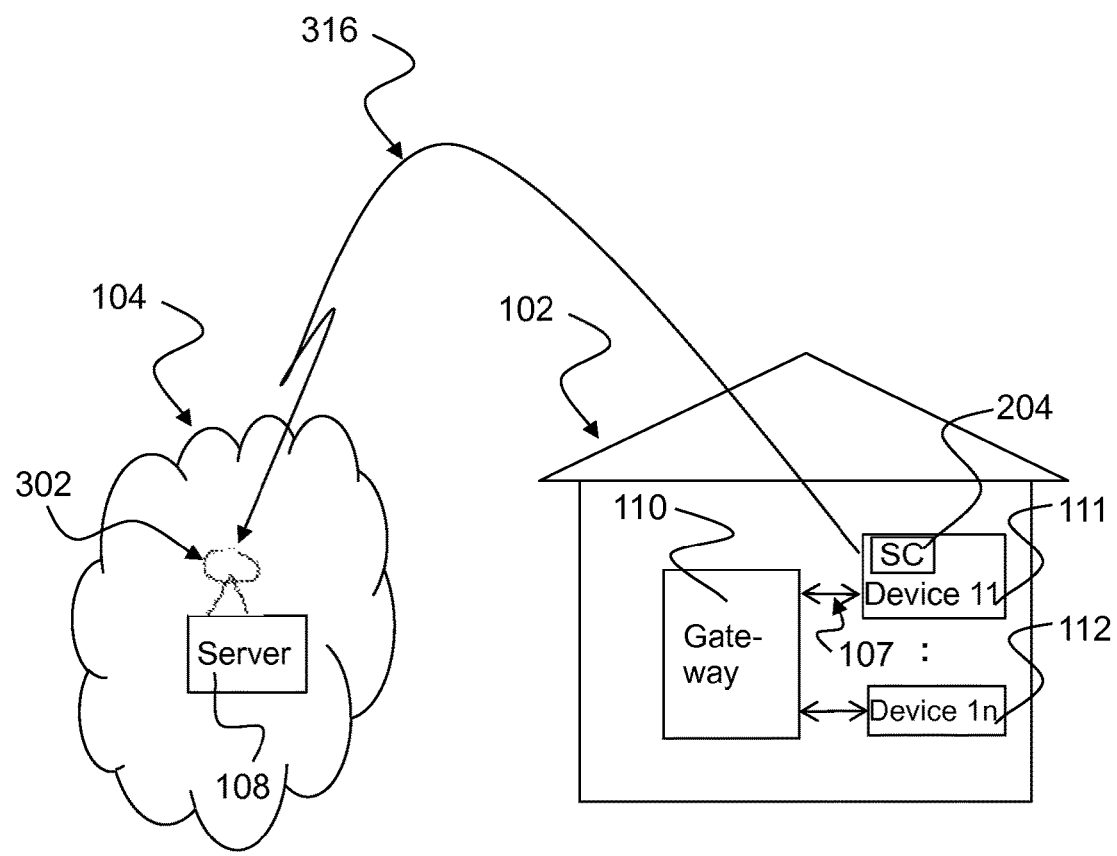
FIG. 3 is a schematic view of the control of a building automation network 102 according to a gateway topological approach comprising a gateway 110, in which a building-internal communication entity 111 takes over the connection to the server 108, according to one embodiment of the invention.

FIG. 3 is a schematic view of the control of a building automation network 102 according to a gateway topological approach comprising a gateway 110, in which a building-internal communication entity 111 takes over the connection to the server 108, according to one embodiment of the invention.

This scenario case corresponds to the above-described scenario from FIG. 2a. In the event that the internet connection 106 fails, a device 111 equipped with the software container or memory 204 can take over the connection 316 to the backend server 108 when said server 108 has a mobile communication adapter 302.

Figure 4:
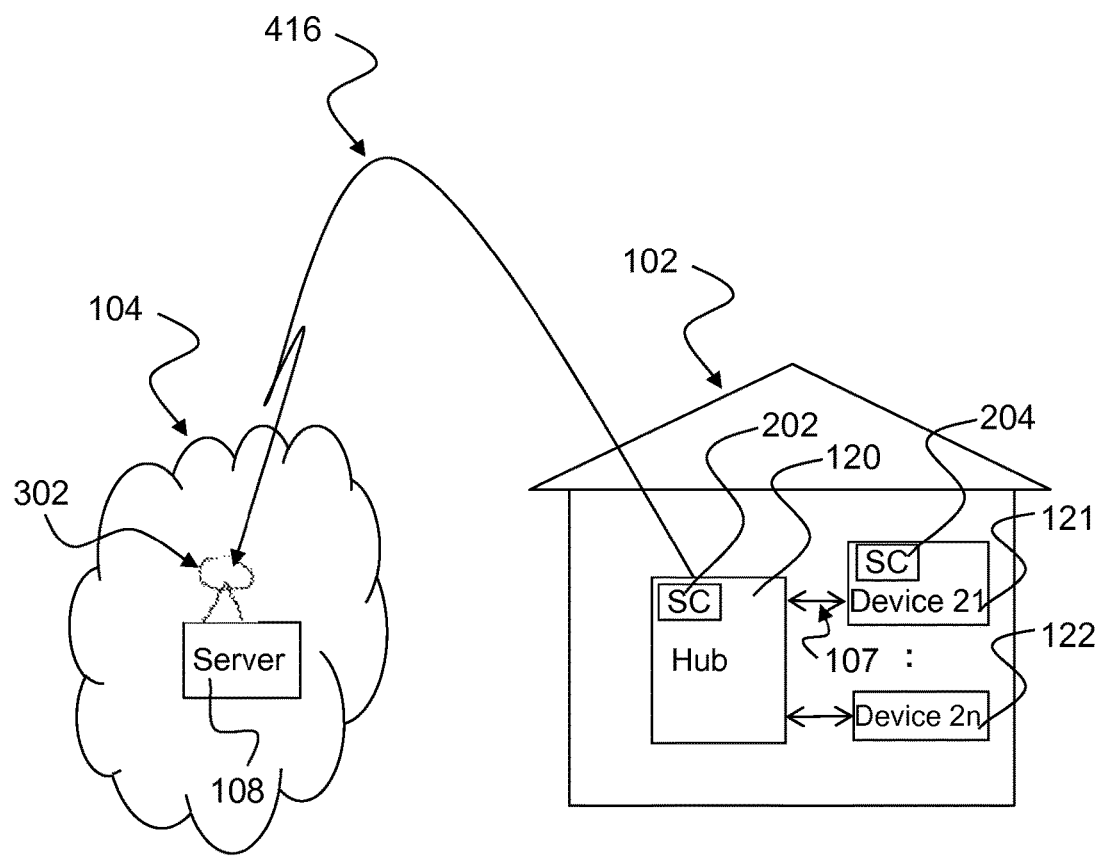
FIG. 4 is a schematic view of the control of a building automation network 102 according to a gateway topological approach comprising a hub 120, in which the hub 120 takes over the connection to the server 108, according to one embodiment of the invention.

FIG. 4 is a schematic view of the control of a building automation network 102 according to a gateway topological approach comprising a hub 120, in which the hub 120 takes over the connection to the server 108, according to one embodiment of the invention.

This scenario case is similar to the above-described scenario from FIG. 2b. In any case, in the case of this fall-back scenario, the hub 120 can establish a wireless connection 416 to the server 108 instead of the conventional broadband wired connection 116 as shown in FIG. 2b. The software container or memory 202 can be used in this case to transfer local services or authentication data to the devices 121, 122 of the building-internal network 102.

In the scenario of a home automation system in FIG. 4, the heating control can take over the functionality of the hub 120 for some of the devices 121, 122 in the building-internal communication network 102 or home automation network, for example for the heating thermostats, and can communicate directly with the backend server 108 on the internet 104 for said devices. In the case where the internet connection is interrupted, the heating control on the software container 204 can access a mobile communication device and transfer its access data to said device, which has a mobile communication connection or another form of uninterruptible internet connection. The heating control can transfer the software container 204 to said device and then connect to the internet via said device. As soon as the regular internet connection has been re-established, the access data can be transferred back to the heating control.

Alternatively, in the software container 204, instructions to the heating control can also be deposited, in the event that the internet connection fails, to switch to autonomous, local operation so that it is possible to carry out uninterruptible operation of the heating of the housing until the internet connection is re-established.

Figure 5:
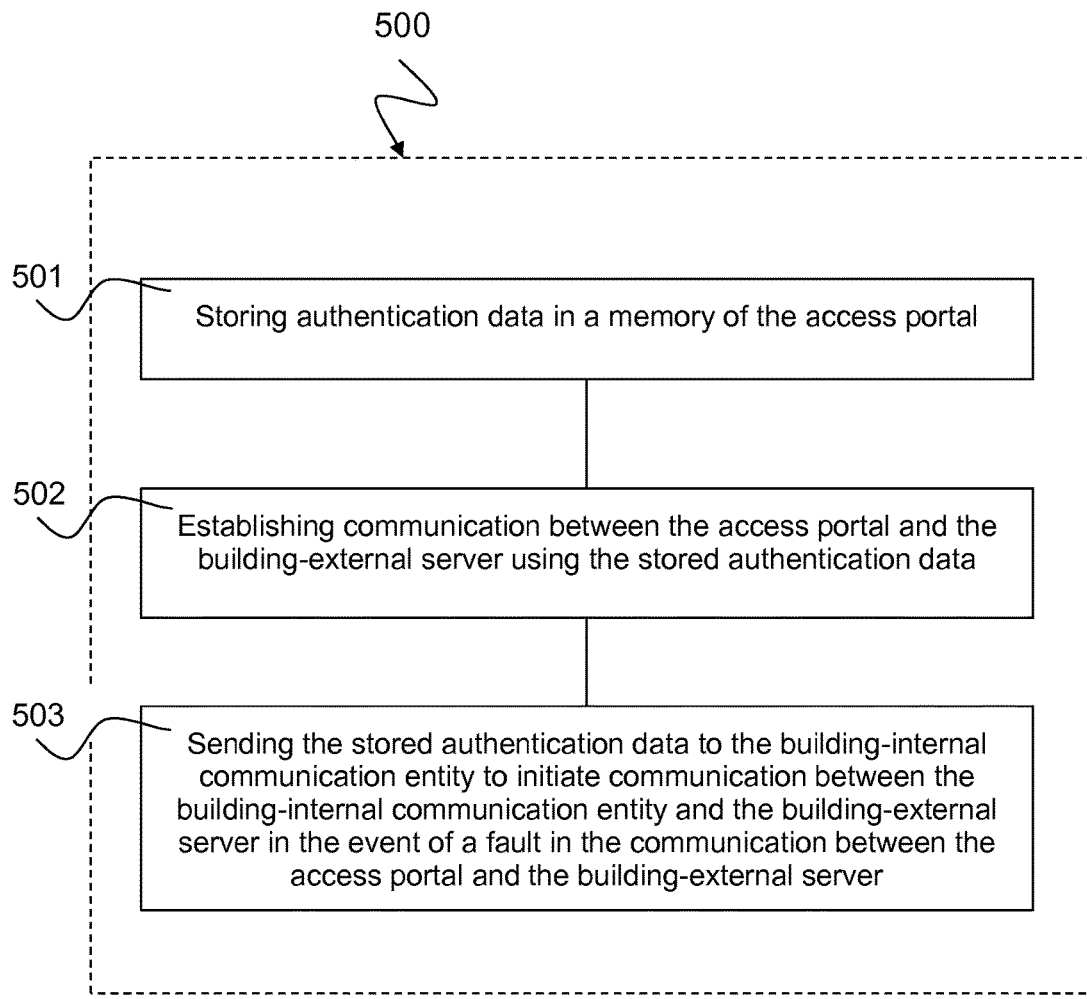
FIG. 5 is a schematic view of a method 500 for controlling communication between a building-external communication server of a building-external communication network and a building-internal communication entity of a building-internal communication network according to one embodiment of the invention.

FIG. 5 is a schematic view of a method 500 for controlling communication between a building-external communication server of a building-external communication network, for example a communication server 108 as described in FIGS. 2 to 4, and a building-internal communication entity, for example a controllable actuator or a controllable sensor as described in FIGS. 2 to 4, of a building-internal communication network, for example of a building automation network according to one embodiment of the invention.

The method 500 comprises storing 501 authentication data for initiating a communication connection to the building-external communication server in a memory of an access portal, for example of a gateway 110 or a hub 120 as described in FIGS. 2a, 2b, 3 and 4, to control the communication between the building-external communication server and the building-internal communication entity, for example a software container 204, 214 as described in FIGS. 2a, 2b, 3 and 4.

The method 500 comprises establishing 502 communication with the building-external communication server by means of the access portal using the stored authentication data.

The method 500 comprises sending 503 the stored authentication data to the building-internal communication entity by means of the access portal to initiate a communication connection between the building-internal communication entity and the building-external communication server in the event of a fault in the communication connection between the access portal and the building-external communication server.

The access portal can be a gateway, a hub or a router, as described in FIGS. 2a, 2b, 3 and 4.

Figure 6:
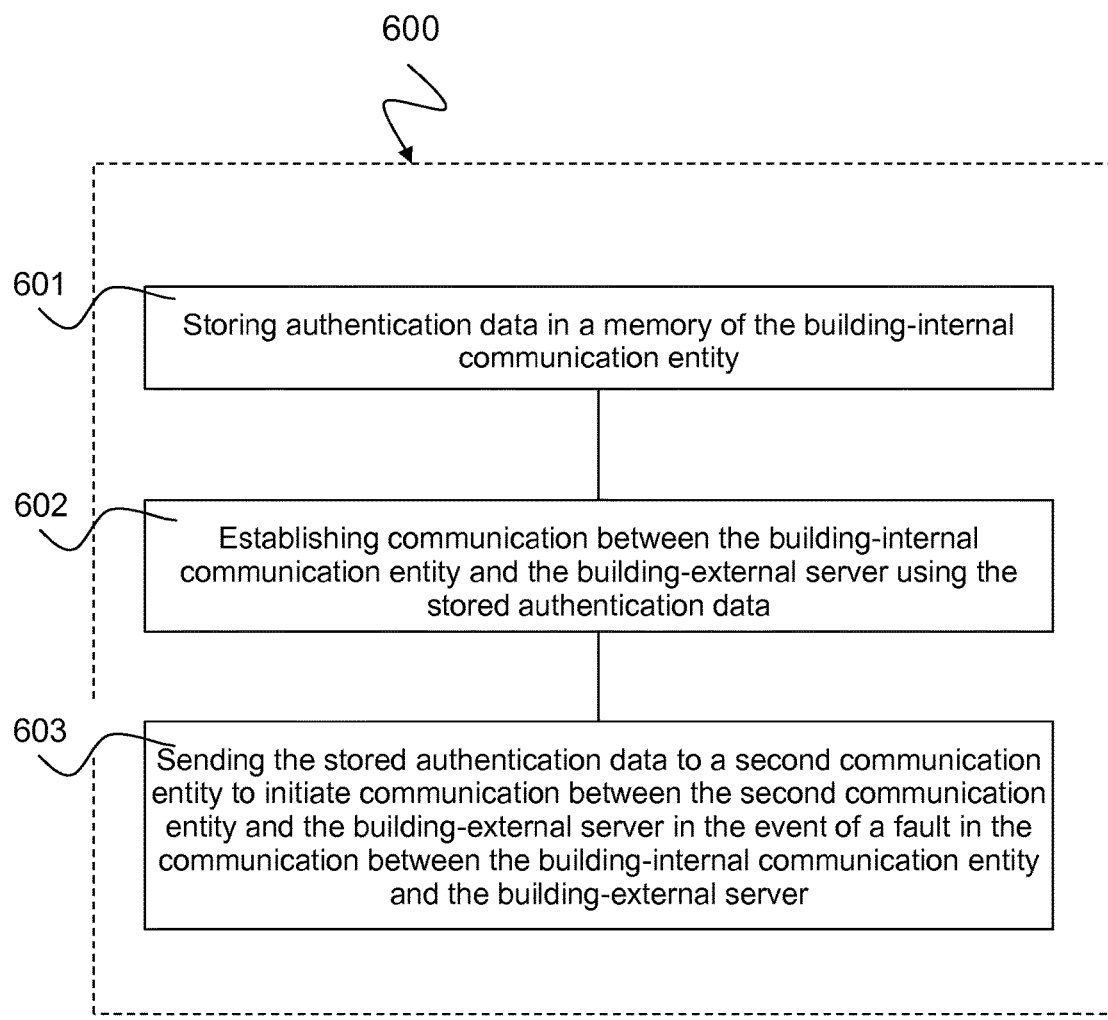
FIG. 6 is a schematic view of a method 600 for controlling communication between a building-external communication server of a building-external communication network and a building-internal communication entity of a building-internal communication network according to a further embodiment of the invention.

FIG. 6 is a schematic view of a method 600 for controlling communication between a building-external communication server of a building-external communication network, for example a communication server 108 as described in FIGS. 2 to 4, and a building-internal communication entity, for example a controllable actuator or a controllable sensor as described in FIGS. 2 to 4, of a building-internal communication network, for example of a building automation network according to a further embodiment of the invention.

The method 600 comprises storing 601 authentication data for initiating a communication connection to the building-external communication server in a memory of the building-internal communication entity, for example a software container 224 as described in FIG. 2c.

The method 600 comprises establishing 602 communication with the building-external communication server by means of the building-internal communication entity using the stored authentication data.

The method 600 comprises sending 603 the stored authentication data, by means of the building-internal communication entity, to a second communication entity, for example a smartphone 241 as described in FIG. 2c, to initiate a communication connection between the second communication entity and the building-external communication server in the event of a fault in the communication connection between the building-internal communication entity and the building-external communication server, for example a mobile communication connection 236 between the smartphone 241 and the server 108, as described in FIG. 2c.

The method 600 can comprise establishing a communication connection 227 between the building-internal communication entity 131 and the second communication entity 241. The method 600 can comprise controlling the building-internal communication entity based on the communication connection 236 between the second communication entity 241 and the building-external communication server 108, and the communication connection 227 between the second communication entity 241 and the building-internal communication entity 131 by means of the building-external communication server 108.

The second communication entity 241 can be a second building-internal communication entity of the building-internal communication network. The second communication entity 241 can be a control unit 241 for controlling the building-internal communication entity 131 of the building-internal communication network (as shown in FIG. 2c), in particular a smartphone, a mobile phone, a tablet PC or a communication device comprising a wireless adapter.

One aspect of the invention also includes a computer program product which can be loaded directly into the internal memory of a digital computer and comprises software code portions by means of which the method 500, 600 described in relation to FIG. 5 or FIG. 6 can be carried out when the product runs on a computer. The computer program product can be stored on a computer-suitable medium and comprise the following: computer-readable programming which prompts a computer to store 501 authentication data for initiating a communication connection to the building-external communication server in a memory of an access portal for controlling the communication between the building-external communication server and the building-internal communication entity; establish 502 communication with the building-external communication server by means of the access portal using the stored authentication data; and send 503 the stored authentication data to the building-internal communication entity by means of the access portal to initiate a communication connection between the building-internal communication entity and the building-external communication server in the event of a fault in the communication connection between the access portal and the building-external communication server.

The computer program product can further comprise the following: computer-readable programming which prompts a computer to store 601 authentication data for initiating a communication connection to the building-external communication server in a memory of the building-internal communication entity; establish 602 communication with the building-external communication server by means of the building-internal communication entity using the stored authentication data; and send 603 the stored authentication data to a second communication entity by means of the building-internal communication entity to initiate a communication connection between the second communication entity and the building-external communication server in the event of a fault in the communication connection between the building-internal communication entity and the building-external communication server.

The computer can be a PC, for example a PC of a computer network. The computer can be realised as a chip, an ASIC, a microprocessor or a signal processor and be arranged in a computer network, for example in a building-internal communication network or in a building-external communication network as described in FIGS. 1 to 4.

Features from the various embodiments described herein by way of example can be combined unless specifically stated otherwise. As shown in the description and the drawings, individual elements which have been shown in connection do not have to be directly connected to one another; intermediate elements can be provided between the connected elements. Embodiments of the invention can be implemented in individual circuits, partially integrated circuits or fully integrated circuits or programming. The term "for example" is merely meant as an example and not the best or optimal option. Particular embodiments have been illustrated and described herein, but it is clear to a person skilled in the art that several alternative and/or similar implementations can be carried out instead of the embodiments shown and described without deviating from the concept of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

102: building-internal communication network, building automation network
104: building-internal communication network, internet
106: first communication interface
107: second communication interface
108: building-external communication server, authentication server
110: access portal, gateway
111: building-internal communication entity, controllable sensor or actuator
112: building-internal communication entity, controllable sensor or actuator
116: first communication interface
117: second communication interface
120: access portal, hub
121: building-internal communication entity, controllable sensor or actuator
122: building-internal communication entity, controllable sensor or actuator
126: first communication interface
131: building-internal communication entity, controllable sensor or actuator
202: memory, software container, on gateway
204: memory, software container, on building-internal communication entity
212: memory, software container, on hub
214: memory, software container, on building-internal communication entity
224: memory, software container, on building-internal communication entity
227: second communication interface
236: communication connection between the second communication entity 241 and the building-external communication server 108
241: second communication entity, for example building-internal communication entity, control unit, smartphone, mobile phone, tablet PC, notebook
302: mobile communication adapter of the server 108
316: communication connection between the building-internal communication entity 111 and the building-external communication server 108
416: wireless connection of the hub 120 to the server 108
500: method for controlling the communication between the building-external communication server 108 and a building-internal communication entity
501: 1st method step: storing
502: 2nd method step: establishing communication
503: 3rd method step: sending
600: method for controlling the communication between the building-external communication server 108 and a building-internal communication entity
601: 1st method step: storing
602: 2nd method step: establishing communication
603: 3rd method step: sending

The invention claimed is:
1. A system, comprising:
a building-external communication network, comprising a building-external communication server;
a building-internal communication network, comprising a building-internal communication device; and
an access portal device, configured to control communication between the building-external communication server and the building-internal communication device;
wherein the access portal device comprises:
a first memory located in the access portal device for storing authentication data for initiating a communication connection between the access portal device and the building-external communication server;
a first communication interface with the building-external communication server for establishing communication with the building-external communication server using the stored authentication data, wherein the first communication interface is configured to monitor the communication connection between the access portal device and the building-external communication server and, in the event of a fault in the communication connection between the access portal device and the building-external communication server, to generate a fault message; and
a second communication interface with the building-internal communication device for communicating with the building-internal communication device, wherein the second communication interface is configured to send the stored authentication data from the first memory of the access portal device to a second memory located in the building-internal communication device in response to the fault message to initiate a communication connection between the building-internal communication device and the building-external communication server;
wherein the access portal device and the building-internal communication device are separate devices;
wherein the building-internal communication device comprises a controllable sensor for detecting temperature data;
wherein the first memory of the access portal device is further configured for storing a software container comprising instructions for putting the building into a sleep mode in response to temperature data detected by the controllable sensor indicating that a temperature has fallen below a threshold value, wherein the first memory of the access portal device being configured for storing the software container is based on a selection of the access portal device as being an optimal device out of a plurality of devices for storage of the software container by the building-internal communication network; and wherein the access portal device is configured, in the event of a fault in the communication connection between the access portal device and the building-external communication server, to relay the software container to another device of the plurality of devices for the other device to take over control tasks relating to the sleep mode of the building.

2. The system according to claim 1, wherein the first memory is further configured to store parameters or programs for controlling the building-internal communication device; and wherein the second communication interface is configured to send the stored parameters or programs for controlling the building-internal communication device to the building-internal communication device in response to the fault message.

3. The system according to claim 1, further comprising:
a processor configured to execute control tasks for controlling the building-internal communication device using the second communication interface;
wherein the processor is further configured to execute at least some of the control tasks after sending the stored authentication data to the building-internal communication device.

4. The system according to claim 3, wherein the processor is configured to store at least some control tasks which are no longer executed by the processor after sending the stored authentication data to the building-internal communication device in the first memory in the form of programs.

5. The system according to claim 3, wherein the at least some control tasks which are still executed by the processor after sending the stored authentication data to the building-internal communication device corresponding to a higher load on the second communication interface relative to control tasks which are no longer executed by the processor after sending the stored authentication data to the building-internal communication device.

6. The system according to claim 3, wherein the at least some control tasks which are still executed by the processor after sending the stored authentication data to the building-internal communication device include local control tasks; and
wherein at least some control tasks which are no longer executed by the processor after sending the stored authentication data to the building-internal communication device include remote control tasks.

7. A building-internal communication device of a building-internal communication network, comprising:
a first memory for storing authentication data for initiating a communication connection between the building-internal communication device and a building-external communication server of a building-external communication network, wherein the building-external communication server controls the building-internal communication device;
a first communication interface with the building-external communication server for establishing communication with the building-external communication server using the stored authentication data, wherein the first communication interface is configured to monitor the communication connection between the building-internal communication device and the building-external communication server and, in the event of a fault in the communication connection between the building-internal communication device and the building-external communication server, to generate a fault message; and
a second communication interface with a second communication device for communicating with the second communication device, wherein the second communication interface is configured to send the stored authentication data to a second memory located in the second communication device in response to the fault message to initiate a communication connection between the second communication device and the building-external communication server, wherein the building-internal communication device and the second communication device are separate devices of the building-internal communication network;

wherein the building-internal communication device comprises a controllable sensor for detecting temperature data; and wherein the first memory of the building-internal communication device is further configured for storing a software container comprising instructions for putting the building into a sleep mode in response to temperature data detected by the controllable sensor indicating that a temperature has fallen below a threshold value, wherein the first memory of the building-internal communication device being configured for storing the software container is based on a selection of the building-internal communication device as being an optimal device out of a plurality of devices for storage of the software container by the building-internal communication network;

wherein the building-internal communication device is configured, in the event of a fault in the communication connection between the building-internal communication device and the building-external communication server, to relay the software container to another device of the plurality of devices for the other device to take over control tasks relating to the sleep mode of the building.

8. The building-internal communication device according to claim 7, further comprising:
a processor configured to establish a communication connection to the second communication device via the second communication interface to control the building-internal communication device based on the communication connection between the second communication device and the building-external communication server via the building-external communication server.

9. The building-internal communication device according to claim 7, wherein the communication connection between the second communication device and the building-external communication server includes a mobile communication connection.

10. The building-internal communication device according to claim 7, wherein the second communication device is a second building-internal communication device of the building-internal communication network; or
wherein the second communication device is a control device for controlling the building-internal communication device, wherein the control device is a smartphone, a mobile phone, a tablet PC or a communication device comprising a wireless adapter.

11. The building-internal communication device according to claim 7, wherein the first memory is further configured to store parameters or programs for controlling the building-internal communication device; and
wherein the second communication interface is configured to send the stored parameters or programs for controlling the building-internal communication device to the second communication device in response to the fault message.

12. A method for controlling communication between a building-external communication server of a building-external communication network and a building-internal communication device of a building-internal communication network, comprising:
   storing, in a first memory of an access portal device, authentication data for initiating a communication connection between the access portal device and the building-external communication server, wherein the access portal device and the building-internal communication device are separate devices of the building-internal communication network, and wherein the building-internal communication device comprises a controllable sensor for detecting temperature data;
   establishing, by the access portal device, the communication connection between the access portal device and the building-external communication server using the stored authentication data;
   detecting, by the access portal device, a fault in the communication connection between the access portal device and the building-external communication server; and
   in response to detecting the fault:
      sending, by the access portal device, the authentication data stored in the first memory of the access portal device to a second memory located in the building-internal communication device to initiate a communication connection between the building-internal communication device and the building-external communication server; and
      relaying, by the access portal device, a software container to another device of a plurality of devices for the other device to take over control tasks relating to a sleep mode of the building, wherein the software container is stored in the first memory of the access portal device and comprises instructions for putting the building into the sleep mode in response to temperature data detected by the controllable sensor indicating that a temperature has fallen below a threshold value, wherein the software container is stored in the first memory of the access portal device based on a selection of the access portal device as being an optimal device out of the plurality of devices for storage of the software container by the building-internal communication network.

13. A method for controlling communication between a building-external communication server of a building-external communication network and a building-internal communication device of a building-internal communication network, comprising:
   storing, in a first memory located in the building-internal communication device, authentication data for initiating a communication connection between the building-internal communication device and the building-external communication server, wherein the building-internal communication device comprises a controllable sensor for detecting temperature data;
   establishing, by the building-internal communication device, the communication connection between the building-internal communication device and the building-external communication server using the authentication data stored in the first memory;
   detecting, by the access portal device, a fault in the communication connection between the access portal device and the building-external communication server; and
   in response to detecting the fault:
      sending, by the building-internal communication device, the stored authentication data to a second memory located in a second communication device to initiate a communication connection between the second communication device and the building-external communication server, wherein the building-internal communication device and the second communication device are separate devices of the building-internal communication network; and
      relaying, by the building-internal communication device, a software container to another device of a plurality of devices for the other device to take over control tasks relating to a sleep mode of the building, wherein the software container is stored in the first memory of the building-internal communication device and comprises instructions for putting the building into the sleep mode in response to temperature data detected by the controllable sensor indicating that a temperature has fallen below a threshold value, wherein the software container is stored in the first memory of the building-internal communication device based on a selection of the building-internal communication device as being an optimal device out of the plurality of devices for storage of the software container by the building-internal communication network.

* * * * *